Feb. 9, 1937.　　　　　H. H. LINN　　　　　2,070,015
TRACK TRAILER
Filed March 25, 1935　　　5 Sheets-Sheet 1
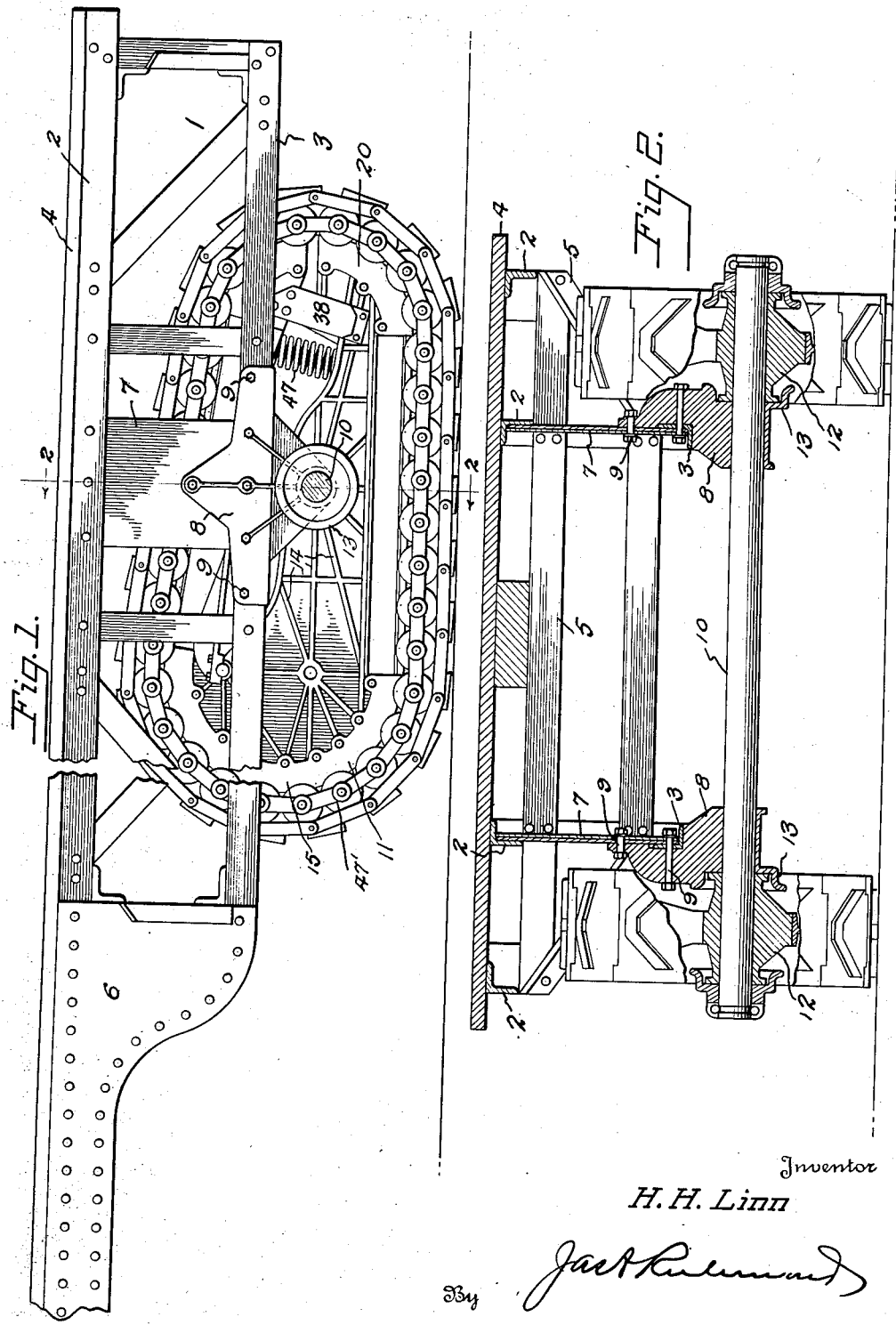
Inventor
H. H. Linn

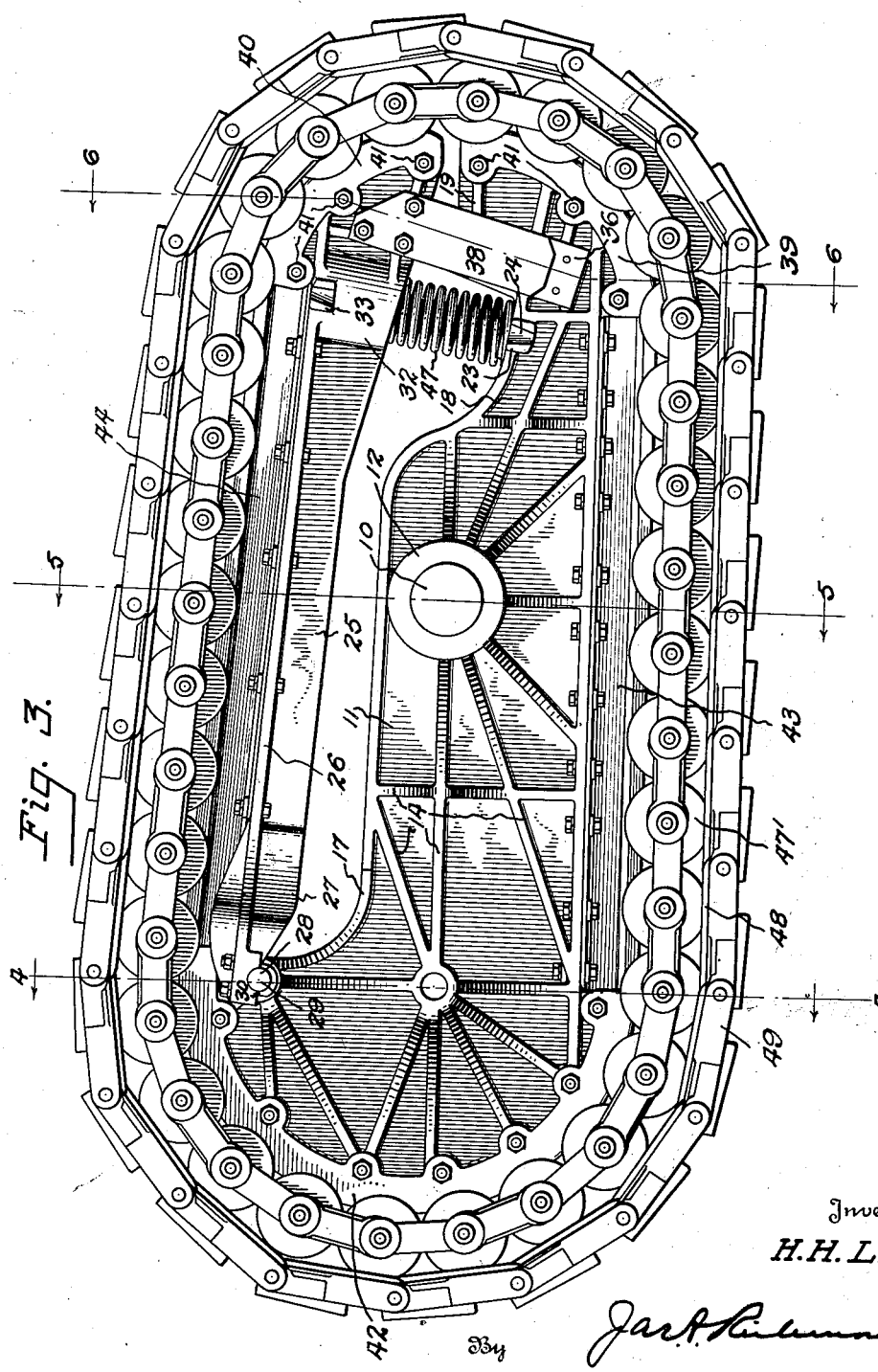

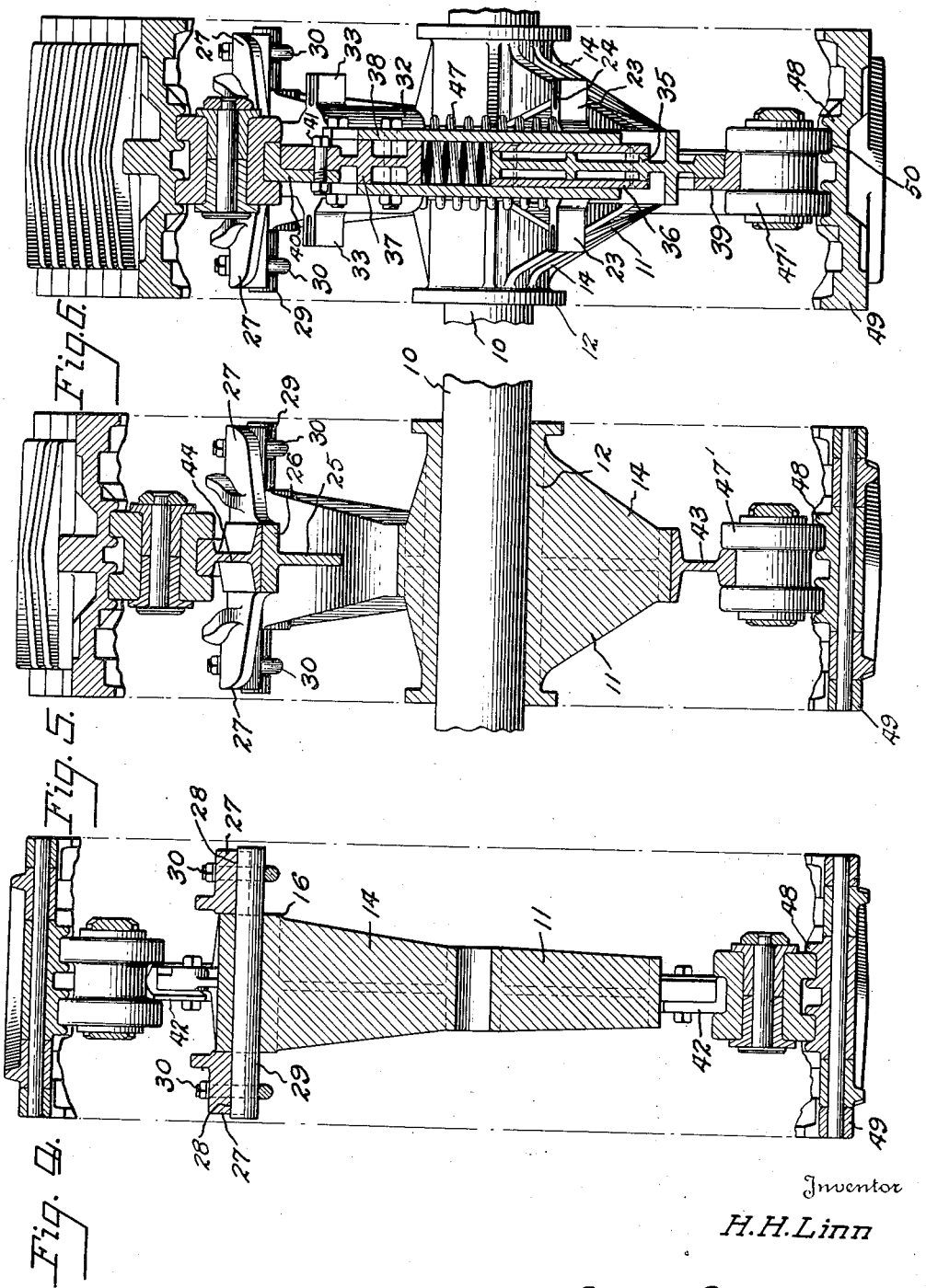

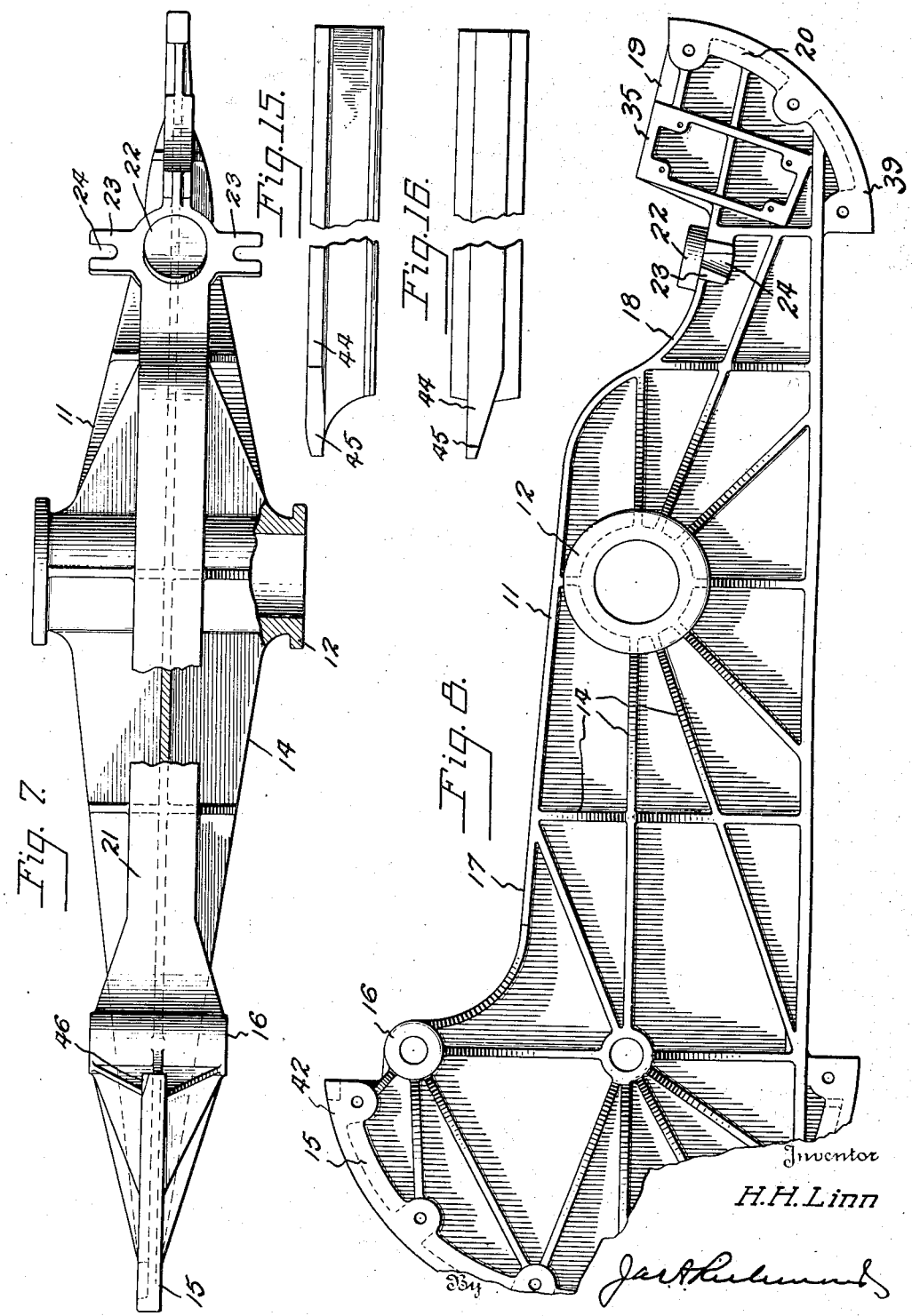

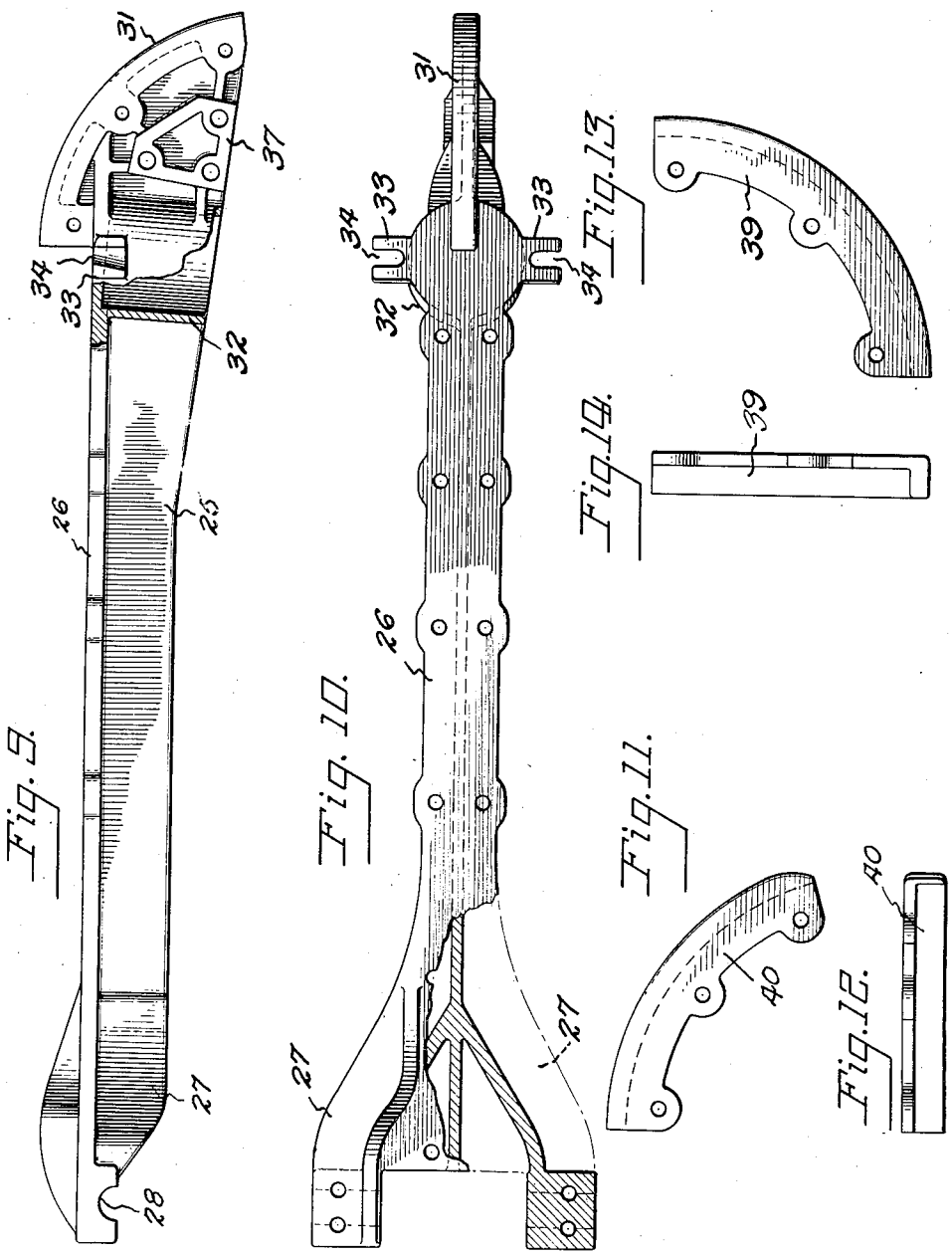

Patented Feb. 9, 1937

2,070,015

UNITED STATES PATENT OFFICE 2,070,015

TRACK TRAILER

Holman Harry Linn, Morris, N. Y., assignor to The Linn Manufacturing Corporation, Morris, N. Y., a corporation of New York Application March 25, 1935, Serial No. 12,974

3 Claims. (Cl. 305—4)

The invention is a track trailer of simple construction and characterized by self-laying tracks so designed as to be free of load-carrying axles and of sprockets and like revolving parts, the presence of which would militate against the smooth running of the track under conditions of exceedingly rough terrain or of mud, snow and ice, and further characterized by its inclusion of a single equalizing support for the track assembly and of an automatically responsive track adjusting element.

The improved trailer includes a track guide plate movably mounted on a chassis supporting axle and having track runners or guides in part removably connected thereto, and an associated track take-up with removably applied track guides, the take-up automatically compensating for undesirable track play and effective to maintain the track at all times in free running condition.

The invention is illustrated in the accompanying drawings, in which

Figure 1 is a side elevation of the improved track trailer.

Fig. 2 is a section substantially on line 2—2 of Fig. 1.

Fig. 3 is an enlarged side elevation of the track assembly.

Fig. 4 is a section on line 4—4 of Fig. 3.

Fig. 5 is a section on line 5—5 of Fig. 3.

Fig. 6 is a section on line 6—6 of Fig. 3.

Fig. 7 is a top edge view of the track guide plate or carrier.

Fig. 8 is a broken side elevation of the same.

Fig. 9 is a side elevation of the track take-up.

Fig. 10 is a top plan view of the same.

Fig. 11 is an elevation of the track runner for the take-up.

Fig. 12 is an edge view of the same.

Fig. 13 is an elevation of the track carrier runner.

Fig. 14 is an edge view of the same.

Fig. 15 is a broken elevation of the fixed track runner of the take-up.

Fig. 16 is a plan of the same.

The improved track trailer includes a chassis 1 comprising upper and lower angle bars 2 and 3 extending longitudinally of the chassis, the bars 2 supporting a platform or body 4. The lower frame bars 3 are disposed inwardly of the outermost upper frame bars, being in fact in vertical alignment with the intermediate or inner frame bars 2, as shown more particularly in Fig. 2. Transverse elements or struts 5 unite the longitudinally ranging members and provide a substantially rigid frame of appropriate strength. A tongue or other connector 6 is designed to form a prolongation of the chassis and to provide an additional support for the platform 4.

The intermediate upper frame bars 2 and the lower frame bars 3 are joined by tie plates 7, the lower ends of which are connected to bearing blocks 8. The latter extend below the lower frame bars 3, and are rigidly connected to them and to the plates 7 by bolts 9. A shaft or axle 10 is mounted in the bearing blocks and projects therefrom in both directions to accommodate the track assembly.

Each track assembly includes a track carrier which, as shown more particularly in Figs. 7 and 8, is in the form of a unit casting 11, having a shaft center or hub 12 to accommodate the shaft 10, the ends of the hub cooperating with housing members 13. The casting is suitably reinforced or braced by angularly disposed webs 14 whereby it has great strength in proportion to its relatively light weight. The forward end of the carrier is curved at 15, in consonance with the path of travel of the forward end of the track, the upper rail immediately in rear of the curved formation being provided with a pin 16 and being sharply reduced in vertical dimension in rear thereof and then gradually inclined downwardly at 17 toward the rear end. Adjacent the rear end the carrier is further reduced in vertical dimension, as at 18, and at the rear end it is increased in vertical dimension throughout a portion 19, the edge of which is curved at 20 in correspondence with track travel. The upper edge of the carrier throughout the range or extent of the portions 17 and 18 presents a relatively broad track receiving surface 21, provided with an upstanding annular stud 22 and with arms 23 projecting in opposite directions from the stud, the free ends of which are slotted as at 24.

The track support includes, in addition to the carrier, a track take-up, shown more particularly in Figs. 9 and 10. It embodies a girder-like structure 25, the top whereof is formed as a relatively broad rail 26. The forward end of the take-up is bifurcated to provide arms 27, formed with recessed bearings 28 designed to straddle the pin 16 of the carrier, with the recesses 28 engaging a shaft 29 passed through the bearing pin and U-bolts 30 securing the carrier and take-up for relative swinging movement at this point. At the rear end the take-up is formed with a curved section 31 corresponding to track travel and designed removably to receive a track runner. The track section 31 extends above the broad bearing portion 26 to permit the track runner, when applied to the section 31, to register and align with the runner to be applied to the rail or track bearing portion 26.

Ahead of the track section 31, the take-up is formed with a cylindrical cup 32 which, when the take-up is in place on the carrier, is arranged above the stud 22 and slightly rearwardly inclined or offset from the perpendicular. The closed end of the cup is provided with lateral arms 33 slotted as at 34. The slots 34 of the take-up member are aligned with the slots 24 of the carrier for the reception of bolts or other fastenings for relatively securing the parts.

Ribbed or paneled areas 35 on each side of the carrier serve to secure guide plates 36. Similar provisions 37 on the take-up carry guide plates 38 which cooperate with guide plates 36 to prevent lateral movement of the take-up.

Parts 20 of the carrier and 31 of the take-up are designed to receive runners, indicated respectively at 39 and 40. The runners are of angle form so as to overlie the free edges of the portions 20 and 31 and be removably secured to place, as by bolts 41. The part 15 of the carrier is provided in similar fashion with a runner 42. The lower portion 21 of the carrier intermediate the runners 39 and 42 has a fixed trackway 43 and the upper bearing portion 26 of the take-up has a similar fixed trackway 44.

The end of the trackway 44 adjacent the free end of runner 42 is reduced in width, as at 45, Fig. 16, and the end of the runner 42 adjacent the reduced end of the track 44 is also reduced in width, as at 46, Fig. 7, to insure normal travel of the roller bearing of the trackway in the compensating adjusting movements of the take-up. A coil spring 47 is arranged between the rear ends of the carrier and take-up, the lower end of the spring seating over the stud 22 of the carrier and the upper end of the spring seating in the cylindrical housing 32 of the take-up.

The trackway proper is substantially similar to that described in Patent No. 1,685,676, issued September 25, 1928, and, while this trackway is preferred, there is no limitation intended by the illustration as any appropriate trackway available for use may be used. For the purpose of the present illustration, the trackway may be said to include a roller chain 47, the rollers of which are channeled for cooperation with the track and runners described. On the roller chain is mounted a self-laying track 48 made up of linked lag plates 49 formed with channels 50 to receive the flanges of the rollers 47.

It will, of course, be apparent that when the endless track is in position the roller chain is adapted for free travel over the tracks and runners provided on the carrier and take-up. As the rear end of the take-up is free of direct connection with the rear end of the carrier and as the spring 47 is under tension when the parts are assembled, it is apparent that the take-up will automatically compensate for any looseness, sudden tightening or other momentary irregularity in the normal travel of the self-laying track and will thus act to maintain the same in the best possible operating condition to insure free running and action.

The track assembly as a whole is movable about the equalizing support, which is the shaft 10, and is otherwise without load bearing resistance when in use. In short, there are no load carrying axles and no sprocket wheels or similar revolving parts calculated to trap mud, ice, snow and the like, and thus impair the normal working action of the track.

Having described the invention, what is claimed as new is:—

1. The combination of an oblong track frame having top and bottom straight portions and rounded ends, and a substantially continuous trackway about its top, bottom and ends, a flexible endless track surrounding said frame and adapted to run on said trackway, the track frame comprising a rigid bottom carrier member and a rigid upper take-up member, the take-up member being pivotally connected at one end to one end of the carrier member, and a spring element interposed between the opposite ends of said members and adapted to hold said opposite ends resiliently apart to tension said endless flexible track, said rigid carrier member comprising the bottom and one rounded end of the track frame, said take-up member comprising the top of the track frame, and the ends of said carrier and take-up members opposite said pivotal connection comprising the other rounded end of the track frame.

2. The combination of an oblong track frame having top and bottom straight portions and rounded ends, and a substantially continuous trackway about its top, bottom and ends, a flexible endless track surrounding said frame and adapted to run on said trackway, the track frame comprising a rigid bottom carrier member and a rigid upper take-up member, the take-up member being pivotally connected at one end to one end of the carrier member, and a spring element interposed between the opposite ends of said members and adapted to hold said opposite ends resiliently apart to tension said endless flexible track, said rigid carrier member comprising the bottom and one rounded end of the track frame, said take-up member comprising the top of the track frame, the ends of said carrier and take-up members opposite said pivotal connection comprising the other rounded end of the track frame, and means effective to prevent lateral movement of the take-up member with relation to the carrier.

3. The combination of an oblong track frame having top and bottom straight portions and rounded ends, and a substantially continuous trackway about its top, bottom and ends, a flexible endless track surrounding said frame and adapted to run on said trackway, the track frame comprising a rigid bottom carrier member and a rigid upper take-up member, the take-up member being pivotally connected at one end to one end of the carrier member, and a spring element interposed between the opposite ends of said members and adapted to hold said opposite ends resiliently apart to tension said endless flexible track, said rigid carrier member comprising the bottom and one rounded end of the track frame, the ends of said carrier and take-up members opposite said pivotal connection comprising the other rounded end of the track frame, and guide plates at each side of the carrier and cooperating with complemental guide plates on the take-up member to prevent relative lateral movement of the take-up member.

HOLMAN H. LINN.